Jan. 30, 1968 D. L. WINSLOW 3,366,526
COLLAPSIBLE TIRE BUILDING DRUM FOR HIGH CROWN TIRES
Filed Aug. 19, 1964 4 Sheets-Sheet 1

INVENTOR.
DOUGLAS L. WINSLOW
BY
JB Holden
ATTORNEY

Jan. 30, 1968   D. L. WINSLOW   3,366,526
COLLAPSIBLE TIRE BUILDING DRUM FOR HIGH CROWN TIRES
Filed Aug. 19, 1964   4 Sheets-Sheet 2

INVENTOR.
DOUGLAS L. WINSLOW
BY
J.B. Holden
ATTORNEY

Jan. 30, 1968  D. L. WINSLOW  3,366,526
COLLAPSIBLE TIRE BUILDING DRUM FOR HIGH CROWN TIRES
Filed Aug. 19, 1964  4 Sheets-Sheet 4

INVENTOR.
DOUGLAS L. WINSLOW
BY
J.B. Holden
ATTORNEY

United States Patent Office 3,366,526
Patented Jan. 30, 1968

3,366,526
COLLAPSIBLE TIRE BUILDING DRUM
FOR HIGH CROWN TIRES
Douglas L. Winslow, Akron, Ohio, assignor to The Goodyear Tire & Rubber Company, Akron, Ohio, a corporation of Ohio
Filed Aug. 19, 1964, Ser. No. 390,671
8 Claims. (Cl. 156—420)

ABSTRACT OF THE DISCLOSURE

A collapsible tire building drum periphery is made up a plurality of drum segments each of which includes a leading sector and a trailing sector and together with linkage means being provided to move the segments through identical paths of movement whereby a collapsible circular condition is achieved. Further improved by the use of end rings that are separated from the drum through collapsing so that the same may be removed from the tire following collapsing of the drum to thus minimize the difficulty of removing the end flanges.

---

This invention relates to the art of pneumatic tire manufacture and in particular has reference to a new and improved type of collapsible building drum designed for use in connection with such manufacture.

In the art of pneumatic tire manufacture, it has long been known that a collapsible building drum can be employed for the purpose of building the carcass portion of the uncured tire into a generally cylindrical form whereupon the building drum can be collapsed to permit removal of the carcass formed thereon.

While collapsible molding drums of this type have been employed for several years past, difficulty has always been encountered with respect to the removal of the bead flanges or end rings that are employed in association with such collapsible building drums. Specifically, it has heretofore been difficult and, in the instance of high crown type tires, extremely difficult to collapse the building drum to the extent required to freely remove the uncured, flat built tire and end rings associated therewith, axially over the collapsed mold. Accordingly, conventional practice dictated that either the end rings be disassembled prior to removal from the drum, or that the entire drum assembly be removed from the building unit as taught in U.S. Patent 2,926,721 issued to J. I. Haase on Mar. 1, 1960.

Brief description of the invention

It has been discovered that the aforementioned disadvantages can be obviated by modifying each conventional arcuate segment that makes up the building drum, into a pair of hinged sectors that coact together to form a single segment, with first means being provided to first collapse the drum in normal fashion, and with second means being further provided to further collapse the sectors about their hinge point so as to effectuate a further reduction in diameter.

It has been found further that if the building drum is provided with interlocking means designed to coact with the end rings per se, that the end rings can be automatically positioned during the period of time that the building drum is being moved to its expanded position, with such interlocking arrangement permitting ready installation of the end rings on the collapsible building drum.

It has further been discovered that with the reduced diameter above described, it is possible to remove the end rings with the tire prior to disassembly of the same for re-use and in this regard, it has been found that the disassembly and assembly of the end rings in question can be enhanced from a time standpoint by utilizing quick disconnect type of connections such as pin and groove connects which facilitate such quick disconnect of the link components.

It has further been found that by use of such end rings and articulated drum segments as above described, that following drum collapse after the building operation has been completed, that the uncured tire can be removed with the end rings intact therein by virtue of the fact that the effective diameter of the drum has been reduced to a point where the assembled end rings can be freely placed axially over the same.

Production of an improved building drum having the above advantages accordingly becomes the principal object of this invention with other objects thereof becoming more apparent upon a reading of the following brief specification, considered and interpreted in the light of the accompanying drawings.

Figure 1:
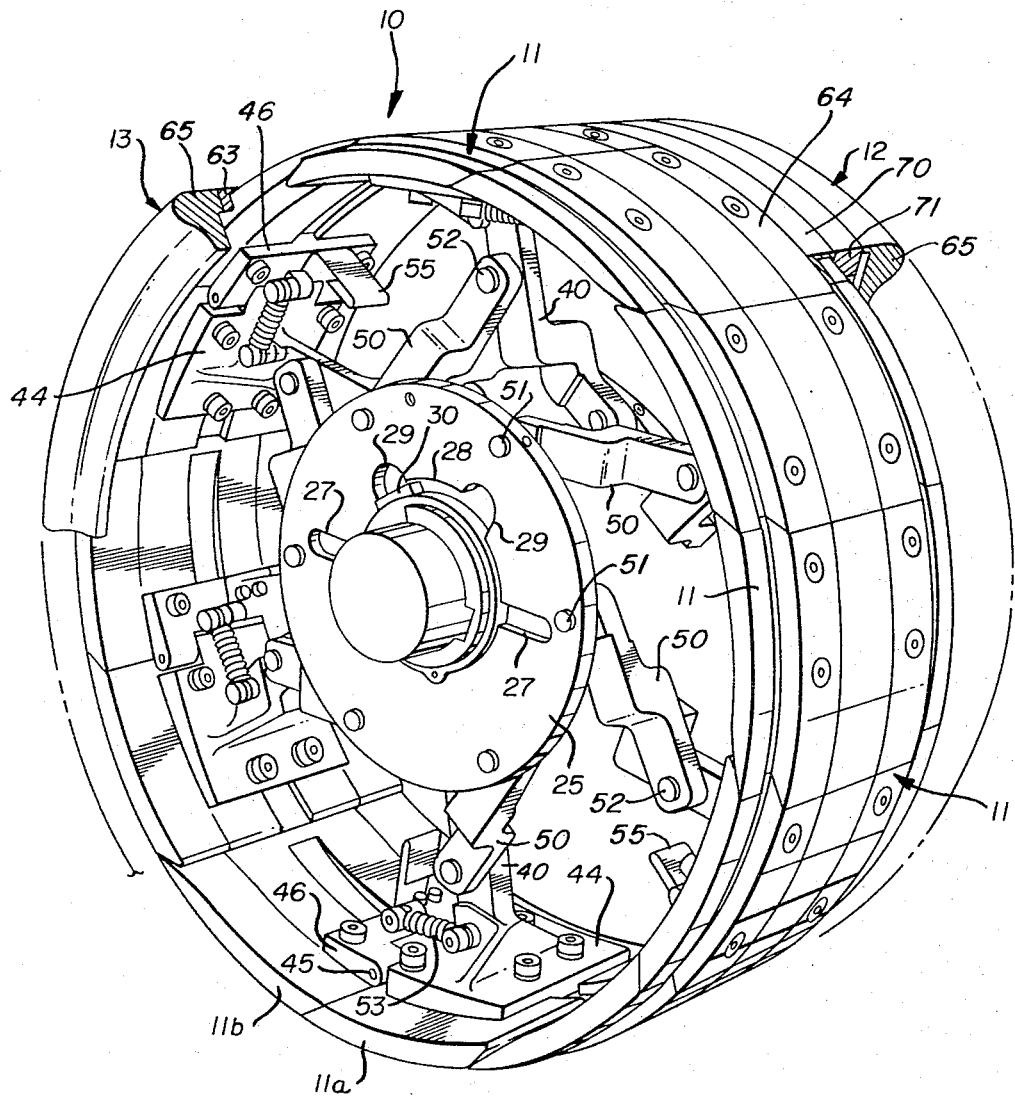
FIGURE 1 is a perspective view of the improved building drum in its expanded position and showing the end rings attached thereto with the same being broken away in portions for the sake of clarity.
Figure 2:
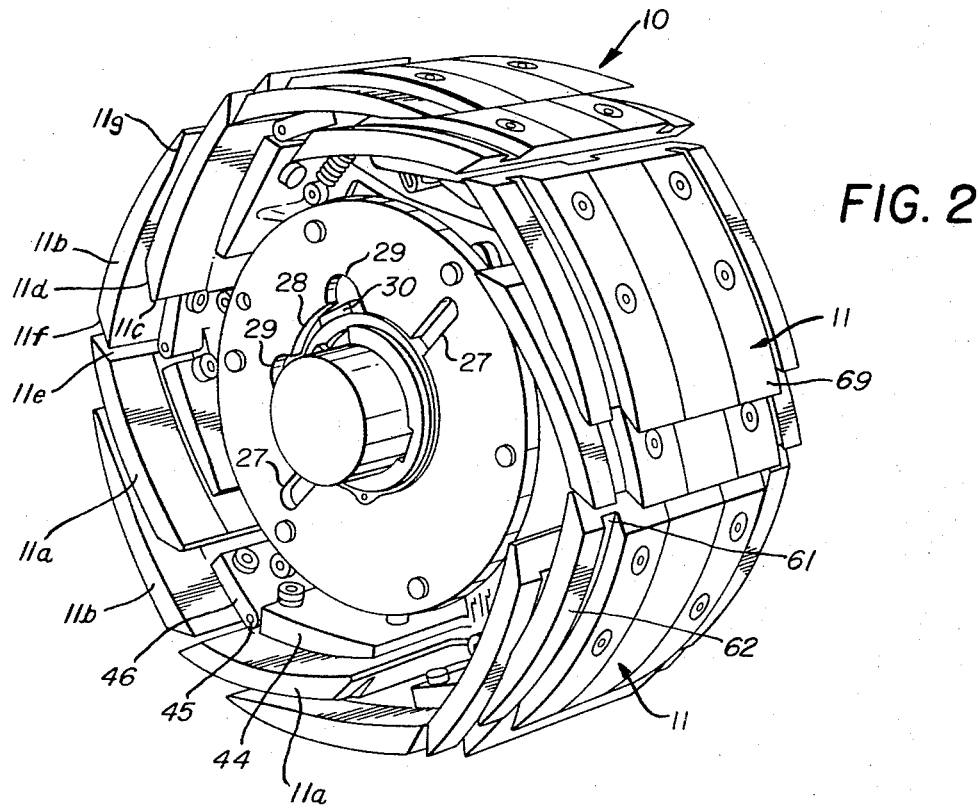
FIGURE 2 is a view similar to FIGURE 1 but showing the drum in its collapsed position.

Referring now to the drawings and in particular to FIGURES 1 and 2 thereof, the improved building drum, generally designated by the numeral 10, includes a series of arcuate drum segments 11, 11, each being of identical configuration and cooperating together to define the peripheral surface of drum 10, with segments 11, 11 being movable between the expanded position of FIGURE 1 and the collapsed positoin of FIGURE 2 by linkage mechanisms that will be described, and with end rings 12 and 13 being releasably connected to the opposed axial edges of the building drum 10 so as to facilitate formation of the bead portions of the pneumatic tire being built as will be described.

Figure 4:
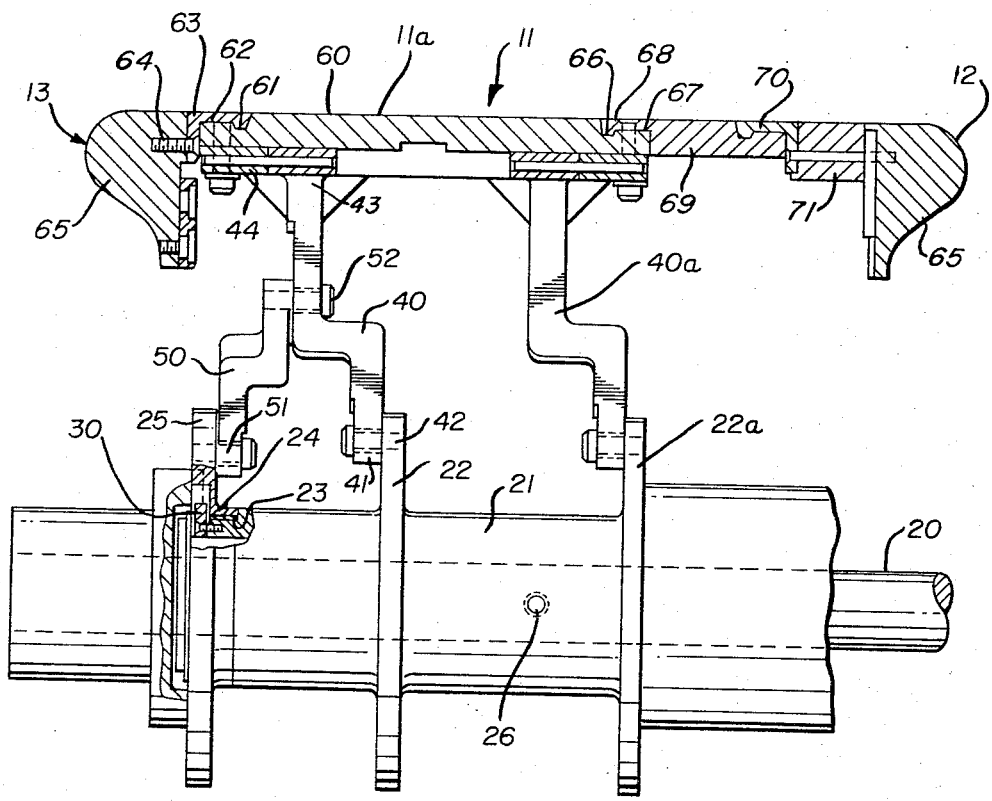
FIGURE 4 is a sectional view taken on the lines 4—4 of FIGURE 3.

In this regard and referring to FIGURE 4, it will first be noted that a drive shaft 20 is telescopically journaled within a drive sleeve 21, with sleeve 21 having a radially projecting flange or rib portion 22 as well as an undercut 23 adjacent the outboard end upon which a collapse sleeve 24 may be rotatably journaled, with sleeve 24 having a radially projecting rib or flange 25 as clearly shown in FIGURE 4 of the drawings, and with pin 26 serving to drive sleeve 21 in unison with the drive shaft 20.

Referring to FIGURES 1 and 2, the plate-like rib 25 has diametrically opposed slots 27, 27 as well as a slot 28 that extends arcuately and intermediately of radial cutouts 29, 29. In this regard and again referring to FIGURE 4, it will be noted that a lug 30 is shown secured to the forward end of sleeve 21 with such sleeve serving to limit the extent of oscillatory movement of sleeve 24 with respect to sleeve 21 and with the limit of such oscillatory movement being respectively shown in FIGURES 1 and 2 of the drawings.

In this regard, any suitable arrangement can be employed for the purpose of effectuating the aforementioned oscillatory movement, with it being possible to utilize a manual operative spanner wrench of known type. Preferably, however, the mechanism for effectuating such movement will be tied into the drive shaft 20, so as to utilize a common source of power with automatic means for effectuating such oscillatory movement through drive lugs received in slots 27, 27.

As previously indicated, the drum segments 11, 11 are collapsed through the medium of linkages that operatively associate the same with both the drive sleeve 21 and the collapse sleeve 24, with this arrangement being best shown in FIGURES 1 through 4 of the drawings. Accordingly and referring first to FIGURE 4, it will first be noted that a first series of link arms 40, 40 of identical configuration are each shown having one end 41 thereof pinned, as at 42, to the periphery of the rib 22 with the points of pivotal connection being equidistant from each other as clearly shown in FIGURE 3 of the drawings.

Figure 3:
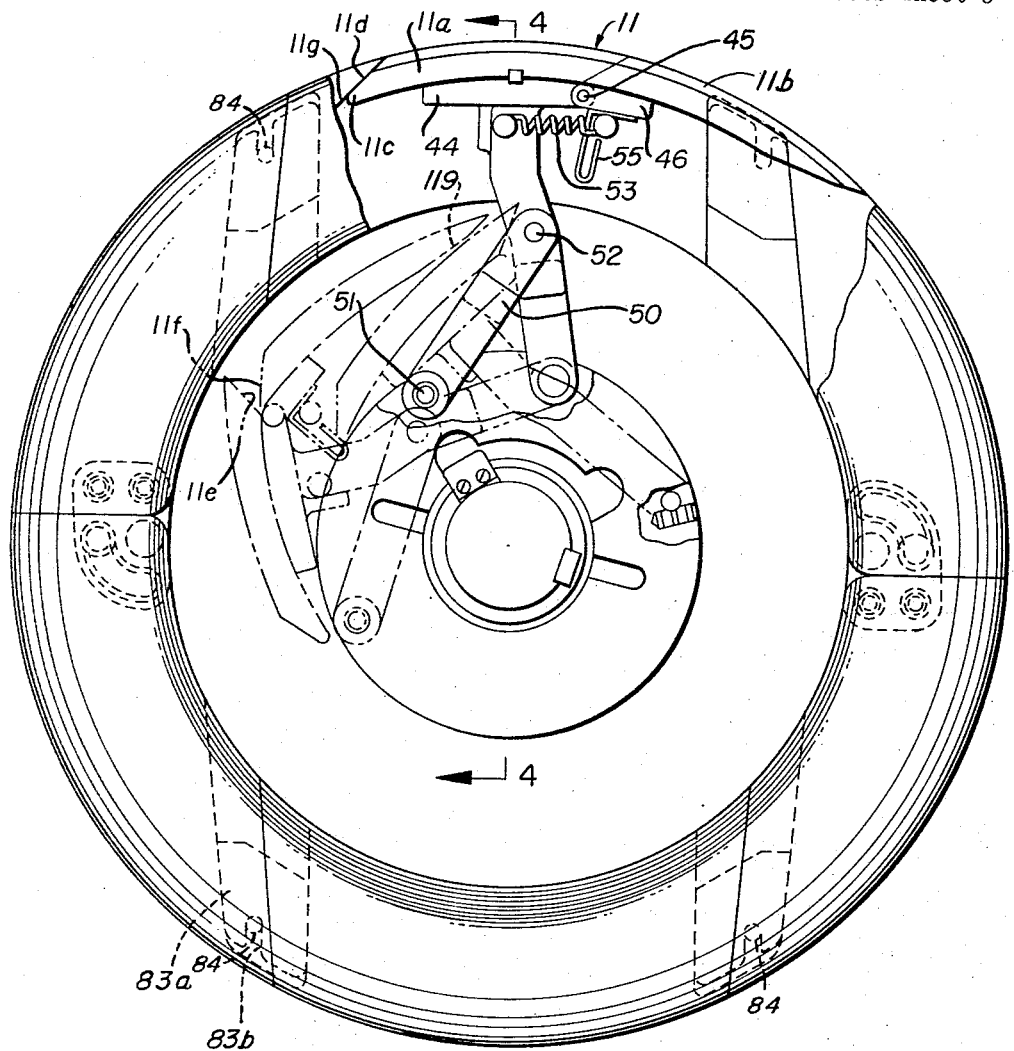
FIGURE 3 is an end elevational view partly broken away and showing the position of the arcuate drum segments in expanded and collapsed position.

The remaining end 43 of each link arm is rigidly connected, by mounting plate 44, to the leading sector 11a of each arcuate drum segment 11, with plate 44 also being pivotally connected as at 45 to a mounting plate 46 that is in turn bolted to the trailing sector 11b of each arcuate segment 11, with this condition of component parts being best illustrated in FIGURES 1, 2 and 3 of the drawings.

In addition to the aforementioned links 40, 40 of which six are illustrated in the preferred form of the invention shown in FIGURES 1 through 4 inclusive, there are provided a second series of identical link arms 50, 50, with each link arm 50 being pivotally pinned at one end to the periphery of rib 25 by the pin 51 for example, while each remaining outboard end thereof is pinned, as by pin 52, to an intermediate portion of the link arm 40, with this condition being clearly illustrated in FIGURES 1, 3 and 4 of the drawings.

In addition to the aforementioned component parts, certain spring means 53 are shown interconnecting appropriately contoured portions of the support members 44 and 46, with the spring means 53 being provided to bias the leading and trailing sectors 11a and 11b respectively, to the position shown in chain dotted lines in FIGURE 3.

In this regard, each support 46 further supports a spring clip 55, with these spring clips 55 serving to abut the leading edge 11c that is provided on each leading sector 11a, with the clip means serving to urge the individual sectors out of their collapsed position shown in FIGURES 2 and 3. In this regard, it is also to be noted that each leading sector 11a has an inclined frontal transverse edge 11d that terminates in the leading edge 11c just described (see FIGURE 3).

Further, the transverse edges 11e and 11f that are provided on each of the sector members 11a and 11b at their point of pivotal connection, are shown as being complemental so as to overlap each other as clearly shown in full lines in FIGURE 3 as well as in the perspective view of FIGURE 1. Additionally, the trailing transverse edge 11g of each trailing sector 11b is further shown as being complementally tapered for camming reception with the previously described surface 11d, with the surface 11c camming across the surface 11g to retain the trailing sector 11b in the full line position of FIGURE 3 as well as in the position of FIGURE 1 when the drum unit 10 is in its expanded condition.

Referring now to FIGURE 4 of the drawings, it will first be noted that this view is a cross sectional view through the leading sector 11a of one individual arcuate drum segment 11, with it being understood that all such sectors 11a and 11b are similarly shaped in cross section as will now be described.

In this regard and referring to FIGURE 4, the outer face 60 of each segment 11a and 11b is shown undercut, as at 61 and 62, so as to form a groove within which an appropriately shaped flange 63 may be received, with flange 63 being bolted, as at 64, to the main body portion 65 of the bead shoulder ring 13 and with it being understood that a fuller and more complete description of the rings 12 and 13 will be undertaken in ensuing paragraphs.

In like manner, the opposed edge of each sector 11a or 11b, as is shown in FIGURE 4, is further undercut, as at 66 and 67, to receive the complementally shaped edge 68 that is provided on the spacer element 69, with the remaining edge of the spacer element 69 being appropriately contoured to receive the flange 70 that is secured to, but spaced from, the inboard spacer ring 12 by spacer block 71.

It is also to be noted from FIGURE 4 that auxiliary link arms 40a, 40a, that are identical in contour to the arms 40, 40, are also provided on an auxiliary rib plate 22a that is also fixed to drive sleeve 21 so as to move in unison with the arms 40 and thus provide support in the central region of the building drum 10, with it being understood that the arms 40a, 40a could either be dispensed with or that additional arms of this type could be provided at axial spaced points in the event that the width of the tire involved was either less or greater than that shown, with such auxiliary arms merely providing radial support where required.

Figure 6:
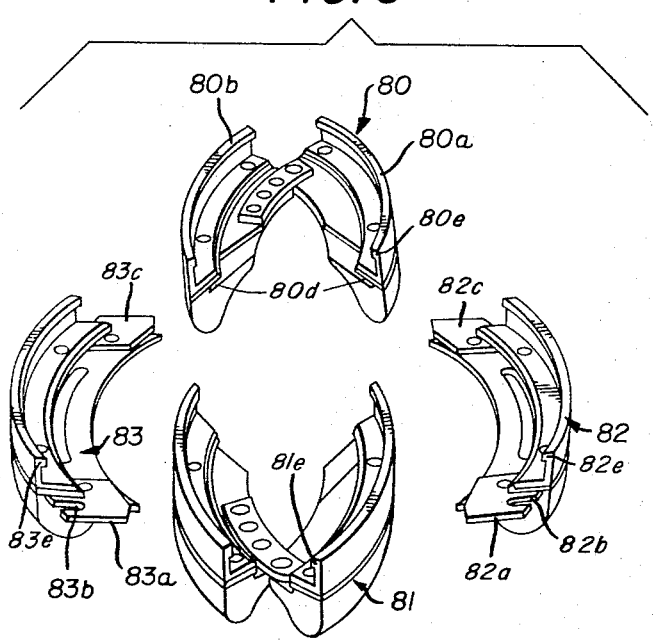
FIGURES 5 and 6 are perspective views of one of the end rings per se respectively shown in assembled rigid condition (FIGURE 5) and in collapsed position (FIGURE 6).
Figure 5:
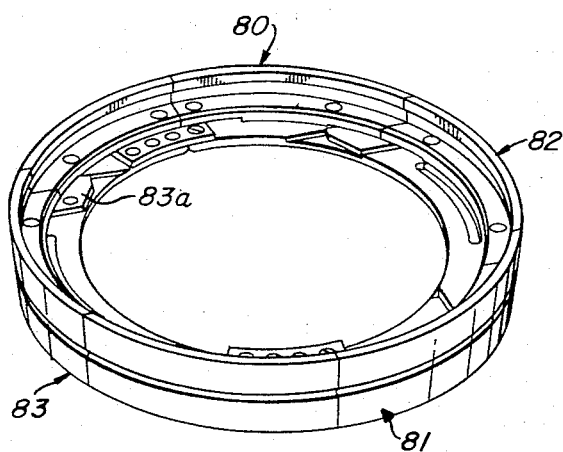

Referring now to FIGURES 3, 5 and 6 for a description of the identical end rings 12 and 13, it will first be noted that each ring is in fact made up of four interlocking components that are indicated in FIGURE 6 by the numerals 80, 81, 82 and 83. In this regard and referring to FIGURE 6, it will first be noted that the units 80 and 81 each constitute a hinged unit including arcuate segments 80a, 80b, and 81a, 81b, and with all units 80, 81, 82 and 83 having the appropriate cross sectional contour as shown in FIGURE 4 and previously described so as to facilitate interlocking engagement with the undercut surfaces 61, 62, 66, and 67 of the drum 10.

The members 80, 81, 82 and 83 have been previously indicated as preferably being contoured for quick disconnection with respect to each other. Accordingly and as shown in FIGURES 3 and 6, the member 83 has a plate 83a and a slot 83b provided on one arcuate end thereof with similar arrangements being shown existing with respect to the member 82 and with the arcuate ends of the members 80 and 81 being provided with appropriate pins 84, 84 (see FIGURE 3) so as to rapidly connect with respect to the groove 83b for example and thus permit assembly of the end rings 12 or 13 to the position of FIGURE 5. In this regard, the remaining ends of members 80, 81, 82 and 83 may be similarly constructed as shown in FIGURE 3 or may be constructed as shown in FIGURE 6 wherein plates 82c, 83c are slidingly received in slots 80d, 80d.

In use or operation of the improved tire building drum 10, it will first be assumed that the component parts have been assembled to the position indicated in the drawings and that the drum 10 is in the collapsed position of FIGURE 2.

At this time, the end ring components 80, 81, 82 and 83 of each end ring 12 and 13 may be assembled from their separated condition of FIGURE 6 to the assembled, full circled position of FIGURE 5. At this time and with a rigid end ring being existent, such end rings 12 and 13 may be respectively inserted and loosely hung over the respective axial end of the drum 10 when the drum is in its collapsed condition so that the grooves 61 or 66 of the drum receive the ribs 80e, 81e, 82e, 83e that are provided on the rings 12 and 13.

When this condition has been achieved, the collapse sleeve 24 may then be appropriately rotated in a clockwise direction from the chain dotted line position of FIGURE 3 so as to move to the position shown in FIGURE 1 and in full lines in FIGURE 3, with such movement resulting in raising of the link arms 40, 40 and 50, 50 to the position shown in FIGURE 1, and further resulting in the sectors 11a and 11b leaving the collapsed position of FIGURE 2 and returning to the end-abutted relationship shown in FIGURE 1.

At this time, the appropriate ply, tread, bead and breaker and miscellaneous carcass components may be applied over the expanded drum 10 with rotation of the expanded drum 10 occurring during this period by virtue of the drive shaft 20 being rotated in a clockwise direction with respect to FIGURE 1.

When the completed carcass has been built on the drum 10 during the period that the same is in the position of FIGURE 1, the appropriate spanner tool may be inserted in the slots 27, 27 and the plate 25 may be moved counter-clockwise in FIGURE 1 to result in a collapse of the drum segments to the position of FIGURE 2. During this collapse, the drum 10 will become separated from the end rings 12 and 13 with these end rings 12 and 13 remaining within the confines of the uncured tire carcass, and with the carcass and end rings being readily removable axially over the collapsed drum to effectuate separation of the tire and rings with respect to the collapsed building drum 10.

With the tire and rings so removed, it will be a relatively simple matter to disassemble the ring 65 to the position of FIGURE 6 with the units merely being shifted so as to disengage the pin and groove connections as previously described. When the rings 12 and 13 have been so disassembled and removed, the same may then be reassembled and positioned on the collapsed drum 10 for repetition of the above described cycle of events.

It will be seen from the foregoing, how there has been provided an improved type of building drum for use in connection with the manufacture of pneumatic tires.

It has been shown how the improved building drum employs a jointed or articulated type of arcuate segment that is attached to a link arm, with the effective diameter of the building drum being reduced not only by the collapsing movement of the appropriate link arms, but with such diameter being further reduced by the subsequent, spring urged collapse of the articulated drum segments as has been described, with this arrangement resulting in a fully nested set of drum segments 11, 11 of sufficiently nominal diameter to permit axial removal of the bead forming mechanism without the need for disassembling the same prior to its removal over the uncured tire.

It has been further shown how the use of interlocking means between the drum and the end rings permit automatic locating of these end rings without the need for operator assistance, with it being further shown how the quick disconnect type of connection between the end ring components facilitates easy disassembly and reassembly of the same in a matter of seconds.

It has been further shown how the improved tire building drum has been provided with spacer means that extend the operative range of this machine over a relatively wide range of axial widths, with a minimum number of changes being required to effectuate building of tires of different tread widths.

While a full and complete description of the invention has been set forth in accordance with the dictates of the patent statutes, it is to be understood that the invention is not intended to be limited to the specific form herein shown.

Accordingly, modifications of the invention may be resorted to without departing from the spirit hereof or the scope of the appended claims.

What is claimed is:

1. A collapsible tire building drum of the character described, comprising:
    (A) a main drive member;
    (B) a first series of link arms pivotally connected at one end thereof to the periphery of said shaft at equally spaced points;
    (C) a plurality of drum segments corresponding in number to the number of said link arms and each including
        (1) a leading sector that is rigidly connected to the free end of each said first link arm and;
        (2) a trailing sector pivoted only to the trailing edge of each said leading sector;
    (D) shifting means for moving said drum segments between extended and collapsed positions and including
        (1) a relatively movable plate member mounted coaxially on said drive member;
    (E) a second series of link arms pivotally connected at their opposed ends to
        (1) the periphery of said plate member and;
        (2) a midportion of each said first link arm, whereby movement of said plate relatively of said drive member results in pivoting movement of each said first link arm with respect to said drive member.

2. The device of claim 1 further characterized by the presence of first biasing means adapted to normally bias each said trailing sector about its point of pivotal connection with said leading sector and towards a collapsed position.

3. The device of claim 2 further characterized by the presence of second biasing means carried by each said segment adjacent its pivot point and being adapted to tensionally engage the leading sector of an adjacent segment during the period said drum is in said collapsed condition.

4. The device of claim 1 further characterized by the fact that said drum is generally circular while in said collapsed condition.

5. The device of claim 1 further characterized by the fact that said drum segments have co-extensive grooves provided in the exterior arcuate surface thereof; and at least one end forming ring adapted to be relatively engaged within said grooves during the period said drum is in said expanded condition.

6. A tire building drum of the character described, comprising:
    (A) a main drive member;
    (B) a series of drum segments each being made up of leading and trailing sectors of approximate equal arcuate length, with the trailing edge of said leading sector being pivoted to the leading edge of said trailing sector;
    (C) linkage means
        (1) supporting each segment with respect to said member;
        (2) moving said drum between extended and collapsed positions;
        (3) positioning said segments in end-abutted circular relationship with each other while said drum is in said expanded condition;
        (4) positioning said sectors in pivotally collapsed circulary-aligned relationship with each other, while said drum is in said collapsed position, with each sector of each segment having identical movement during the period said drum is moving between said collapsed and extended positions.

7. In combination with a collapsible tire building drum:
    (A) first mechanical interlock means carried by said drum at the opposed axial ends thereof;
    (B) first and second end rings;
    (C) second mechanical interlock means carried by each said end ring and adapted to engage said first interlocked means during movement of said drum from said collapsed position to expanded position;
    (D) said end rings being automatically disengaged from said drum during movement thereof to said collapsed position.

8. The device of claim 7 further characterized by the fact that each said ring is made up of a plurality of arcuate segments adapted to be rigidly assembled and disassembled with respect to a condition of rigid circular diameter conforming to said drum diameter in its expanded condition.

References Cited

UNITED STATES PATENTS

| 1,648,132 | 11/1927 | Johnson | 156—419 |
| 2,042,498 | 6/1936 | Bostwick | 156—419 |
| 2,201,468 | 5/1940 | Bostwick | 156—419 |
| 2,214,825 | 9/1940 | Sternad | 156—417 |

FOREIGN PATENTS 231,120  11/1959  Australia.

EARL M. BERGERT, *Primary Examiner.*

CLIFTON B. COSBY, *Examiner.*